United States Patent [19]

Chiotis et al.

[11] Patent Number: 4,735,833

[45] Date of Patent: Apr. 5, 1988

[54] CURABLE FABRIC MEMBER

[75] Inventors: Achilles Chiotis, Menlo Park, Calif.; Darren J. Collett, Swindon, England

[73] Assignee: Raychem Limited, England

[21] Appl. No.: 804,015

[22] Filed: Dec. 3, 1985

[30] Foreign Application Priority Data

Dec. 7, 1984 [GB] United Kingdom ............... 8431040

[51] Int. Cl.⁴ ...................... B32B 27/04; B32B 27/06; B32B 27/12; B32B 31/26
[52] U.S. Cl. .................................... 428/35; 156/155; 156/156; 156/307.1; 156/307.7; 174/DIG. 8; 264/257; 264/324; 264/347; 427/302; 428/36; 428/226; 428/229; 428/251; 428/252; 428/253; 428/284; 428/285; 428/287; 428/413; 428/417; 428/418; 428/420; 428/431; 428/458; 428/949
[58] Field of Search ............... 156/155, 156, 307.1, 156/307.7; 264/257, 324, 347; 427/302; 428/35, 36, 226, 229, 251, 252, 253, 284, 285, 287, 420; 493/949

[56] References Cited

U.S. PATENT DOCUMENTS

| 3,409,497 | 11/1968 | Roseland | 428/288 |
| 4,271,329 | 6/1981 | Perolmuter | 428/36 |

FOREIGN PATENT DOCUMENTS

| 0117736 | 5/1984 | European Pat. Off. . |
| 0117737 | 5/1984 | European Pat. Off. . |
| 0117738 | 5/1984 | European Pat. Off. . |
| 1300074 | 12/1972 | United Kingdom . |
| 1504369 | 3/1978 | United Kingdom . |
| 159705 | 9/1981 | United Kingdom . |

*Primary Examiner*—James C. Cannon
*Attorney, Agent, or Firm*—Yuan Chao; Edith A. Rice; Herbert G. Burkard

[57] ABSTRACT

A latent curing fibre is produced by coating a glass fibre with an (optional) thermoplastic (polyamide) adhesion-promoting layer, a (preferably brittle) curing agent layer (e.g. styrene/maleic anhydride), and a flexible curable layer of epoxy plus curable polyester. Composites of this fibre with non-reactive glass braids consolidate and cure exceptionally well under a heat-shrink sleeve to provide Class F electrical insulation.

33 Claims, 1 Drawing Sheet

Figure 1:
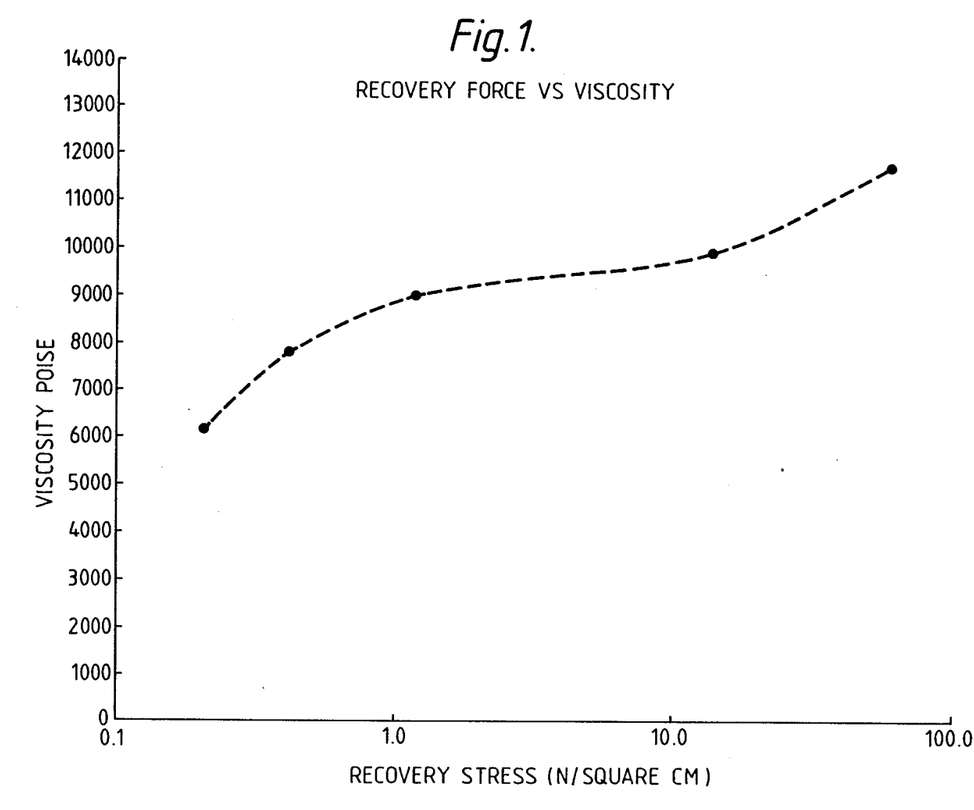

Fig. 1.
RECOVERY FORCE VS VISCOSITY

CURABLE FABRIC MEMBER

This invention relates to a fabric member for use in a curable fabric, to yarns and fabrics comprising such fabric members, and to curable composites containing them.

Curable fabrics are known, for example from U.S. Pat. No. 4,271,329 which describes braids made of two kinds of monofilament, the two kinds being capable of reacting together on heating to effect curing; and from U.S. Pat. No. 3,409,497, which describes a non-woven fabric (e.g. of alcohol-soluble nylon) which is applied a thin solution of a viscous second component (e.g. an epoxy compound) capable of reacting with the fabric material on heating to effect curing and so form a rigid structural member, (e.g. for aircraft bodies).

Curable fabric members comprising at least two elongate melt-formed polymeric components capable of reacting together to effect curing are described and claimed in published European Patent Application No. 0117736. However, the forms of fabric member specifically described in that publication have been found difficult to consolidate and cure satisfactorily into cured composite fabric structures, for example to serve as load-bearing structural members. Those fabric members have also proved incapable of providing composites capable of meeting Class F or higher electrical insulation requirements while maintaining adequate structural strength.

The present invention provides a new form of curable fabric member which can be more successfully consolidated and cured into composite fabric structures, especially for Class F electrical insulation purposes. Class F electrical insulation is defined as insulation capable of supporting the required voltage for at least 20,000 hours at a temperature of 155° C. (I.E.C. Standard 85). For convenient testing, an accelerated test for 168 hours at 220° C. or for 5000 hours at 175° C., is used.

The invention accordingly provides a heat-curable fabric member comprising a filamentary support, a first layer of adhesion-promoting material on the support, a heat-flowable second layer comprising one or more curing agents, and a flexible heat-flowable third layer comprising curable polymeric material, the adhesion-promoting material causing at least the second layer to adhere to the support and the curing agent undergoing a curing reaction with the curable material when their respective layers are heated to a flowable state.

An important aspect of the invention provides brittle curable material, e.g. epoxy resin, in a layer outside the curing agent layer, which was previously thought impracticable owing to the likelihood of the brittle material being shed on flexing of the fabric member. This aspect accordingly provides a heat-curable fabric member comprising a filamentary support, a heat-flowable layer comprising one or more curing agents, and a flexible heat-flowable curable layer comprising brittle curable polymeric material and a further preferably curable polymeric material which flexibilises the brittle curable material, the curable layer forming an outer surface of the fabric member, and the brittle material and preferably the further polymeric material undergoing a curing reaction with the curing agent(s) when their respective layers are heated to a flowable state. The brittle curable material will not itself react to any significant extent with the further curable material, but either may react with the other after first reacting with the curing agent(s). This is to be understood as included in references to both reacting with the curing agent(s). Preferably, these fabric members will also use the first adhesion-promoting layer as specified above.

The adhesion-promoting material will preferably have a softening or melting point not more than 20° C., preferably not more than 10° C., most preferably not more than 5° C., different from that of the second layer, so that melt coating of the second layer will tend to soften or tackify the adhesion-promoting layer and improve the adhesion of the second layer to the support.

The adhesion-promoting layer may comprise known size or other treatments present on the filamentary support, e.g. the size coating normally present on glass fibre yarns if suitably compatible with the subsequent layers, or may comprise material specifically applied for the present purposes. Any materials which promote the adhesion of the curing agent layer to the support may be used, flexible materials being desirable, for example polyesters, ethylene/vinyl acetate copolymers, or preferably polyamides.

The polyamides that are most suitable for forming the adhesion-promoting layer of the curable fabric members are those that are conventionally used as hot-melt adhesive. These polyamides are normally characterized by the fact that their amide linkages are separated by an average of at least fifteen carbon atoms and have amorphous structures in contrast with the more highly crystalline, fibre forming polyamides such as nylon 6 or nylon 6.6. The polyamides have an amine number of at least 1, preferably of at least 5.

The curing agent layer may be flexible for ease of processing, but it has been found unexpectedly advantageous to use a brittle curing agent layer. A brittle layer tends to break up when the fabric members are subjected to pressure to consolidate them into composite structures, and contrary to expected ill effects of such break-up, this tends to enhance the curing reaction. The adhesion-promoting layer is especially useful in this embodiment of the invention, in helping to hold the brittle layer on the filamentary support before curing.

Suitable curing agents can be selected by simple trial, preferred materials being based on styrene/maleic anhydride adducts (e.g. SMA (Trade Mark) products from Arco Chemical Co). For example an 80:20 mixture, by weight, of SMA 2000 (M.W. 1700):dibutyl phthalate (DBP) is preferred, possible alternatives including SMA 3000 (M.W. 1900) alone, SMA 1000 (M.W. 1600) alone, 50:50 mixture of SMA1000 and SMA1440 (M.W. 2500). Other types of curing agent include, for example, solid phenolic novolak resins, and nadyl methyl anhydride.

References to heat-flowable layers are intended to mean layers which are substantially solid at ambient conditions but on heating can be rendered flowable at least until the curing reaction is sufficiently advanced to prevent further flow. Preferably the layers will be flowable not only to the extent required to bring about substantially complete curing, but also to an extent which permits substantially complete consolidation, upon heating, of composite structures initially comprising, for example, a hollow heat-recoverable member, a reinforcing fabric inside the recoverable material, and a layer, preferably a fabric, of the curable fabric members between the recoverable member and the reinforcing fabric. Thus, a degree of flow which results in substantially uniform and complete impregnation of the reinforcing fabric with the curable material is desirable for many purposes, especially for electrical insulation.

On heat-recovery of the recoverable member around a solid substrate at suitable temperatures, curable material provided by fabric members of this invention has been found to penetrate the reinforcing fabric to provide especially uniform consolidation. Other forms of curable fabric member, for example a support carrying a first layer of curable epoxy material overlaid by a second layer of curing agent, have been found not to consolidate nearly so uniformly. By selection of suitable materials, for example a polyamide first layer, a solid anhydride in the second layer and an epoxy resin (preferably with a reactive flexibilizing polymer such as a polyester) in the third layer, the fabric members of the present invention can be consolidated with reinforcing fabric such as a glass braid under a heat-recoverable member of suitably temperature-resistant polymer, preferably polyvinylidene fluoride, e.g. Kynar (Trade Mark), to provide consolidated composite Class F electrical insulation. The fabric members alone can be consolidated without the reinforcing fabric where structures having a relatively low reinforcement content are acceptable. It is an advantage of this invention that especially uniform distribution of the curable material throughout a composite structure is achieved by virtue of the individual curable fabric members each carrying an individual portion of the total curable material, which is thus carried into whichever part of the composite the curable fabric member may be arranged in. This permits construction of large composite structures, without the difficulties in maintaining uniformity which affect liquid resin impregnation methods.

The physical strength of the consolidated composite depends partly on the proportion and arrangement of the filamentary support and reinforcing fabric and partly on the amount and nature of the curable materials present. Thus, electrical performance may be improved by increasing the amount and/or the weave density of the fabric(s) and/or by adding curable material, especially in the form of a further layer of the curable fabric members inside the aforementioned reinforcing fabric, which is thus sandwiched between two curable layers. Electrical performance is not necessarily sacrificed when reinforcement is increased, and in some arrangements electrical insulation performance can be surprisingly increased together with increasing physical strength.

The filamentary support of the curable fabric members may itself contribute to the reinforcement of the composite and therefore preferably has a softening or melting point above the curing temperature. The weights of the layers applied are determined within the limits of providing sufficient flowable curable material and suitable amounts of curing agent for the purpose in question and ability to process increasingly heavily coated fabric members and correct ratios of curing agent to curable material. For example, a glass filamentary support might constitute from 8% to 25% (e.g. 12% or 16 to 19%) by weight, of a fabric member, and a layer (preferably a fabric) of such members could be consolidated alone or with a glass fibre braid to provide a total glass content (excluding any heat-recoverable sleeve) of from 8 to 60, 70 or 75% by weight depending on the strength and electrical performance required. Using fabric members of 0.9 to 1.0 millimeters diameter having a polyamide first layer (10.4 to 12.2% by weight) on a glass fibre support (16–18.6% by weight) with solid anhydride curing agent second layer (32.2 to 34.2% by weight) and epoxy/polyester (1:1) curable third layer (35.2 to 41.2% by weight), a total of 27% glass content would provide good electrical performance (e.g. suitable for Class F insulation of 25 KV, breakdown voltage) with reasonable strength; 30–50% glass content would provide greater strength with similar insulation value (e.g. suitable for 6.5 kv electric motors); and 50% or more glass content would provide even greater strength, with similar breakdown voltage being achievable despite the decreasing proportion of flowable curable material, provided an arrangement is used which minimises the proportion voids in the consolidated composite.

A preferred way of achieving the higher reinforcement contents is to wind a curable fabric member according to this invention around a tubular (or other shaped) mass of the reinforcing material, e.g. a glass fibre braid. Winding has the advantage of eliminating the cross-over points, which are inevitably present in braids or other fabrics, thus reducng to a minimum the amount of curable material per unit area, given that the curable fabric members themselves cannot be reduced below a certain minimum diameter or coating weight for practical production purposes. Filament winding also tends to maximise radial strength, e.g. burst strength, of a tubular composite, at the expense of longitudinal tensile strength, and these two strength characteristics can accordingly be balanced to suit the end use in question by appropriate composite design. Winding of the reinforcing filaments in addition to the curable members could be used to achieve very high radial strengths, if desired.

More than one layer of fabric (e.g. braid) of the curable fabric member may be used to form a composite, together with more than one layer or fabric of non-curable reinforcing fabric members if desired. This provides an advantageous way of making multi-layer composites, compared with direct liquid resin-impregnation or "wet lay up" of pre-impregnated layers. The curable material can be positioned exactly where it is desired e.g. by simply arranging suitable patterns of layers on top of each other, or by patterned or layered weaving or knitting or braiding of the curable fabric members to confine them to, or concentrate them in, selected areas of a fabric, including the possibility of multi-layered weaving or knitting in parts only of a fabric. Intricate shapes can be prepared efficiently in this way, without the problems inherent in impregnation or "wet lay up" methods.

For convenient manufacture and handling of the curable fabric members of this invention, it is preferable that the filamentary support constitute not too high a proportion of the fibre, e.g. less than 30%, preferably less than 20%, more preferably 10 to 15%, by weight. Total glass (or other e.g. carbon fibre or metal) reinforcement contents of more than 30%, especially more than 40% or more than 50%, by weight, are therefore best achieved by providing a monolayer of the curable fabric members, e.g. by winding a monofilament as aforesaid, on a separate glass (or other reinforcing fibre) fabric. Woven or non-woven or braided fabrics of the curable members are less desirable for this purpose, since the many cross-over points of the fabric members result in a higher proportion of curable material per unit area, and increasing the porosity of the fabric to counteract that effect will tend to decrease the uniformity of the eventual consolidated composite.

For similar reasons, the proportion of reinforcement achievable using a fabric of the curable members alone is limited, e.g. to the proportions of filamentary support indicated above.

Composites of reinforcing material and curable material provided by, or incorporating, the curable fabric members of this invention may be consolidated and cured by means of any suitable equipment capable of applying the necessary heat and pressure. For example, a heat-recoverable article may be used, e.g. for electrical insulation, and this may be preassembled with the components of the composite as hereinafter described. Alternatively, hot pressing equipment of various designs may be used to consolidate and cure the composites without heat recoverable materials, e.g. for making structural members such as tennis racquet frames. It will be understood that the curing system and temperature can be chosen to suit the end use. For example, the epoxy resins preferred for Class F electrical insulation tend to cure at 150°-175° C. for several hours, whereas materials for tennis racquet frames may be chosen to cure at 130°-150° C. for perhaps 30 minutes.

These aspects of the invention accordingly provide a composite assembly of curable fabric members according to the invention together with other non-curable fabric members, arranged so that the composite can be consolidated and cured by application of heat and pressure; and a composite assembly associated with a dimensionally recoverable (preferably heat-recoverable) driver so that recovery of the driver in use compresses the composite to assist consolidation thereof.

It will be understood that reference herein to "fabric members" are intended to include long monofilaments (length:diameter >100:1) or staple fibres, and yarns comprising such monofilaments or made from such staple fibres, some or all of the filaments or staple fibres in the yarns being of the aforementioned kind incorporating the three layers; and that "fabric members" refers to these fabric members regardless of whether or not they are actually incorporated in a fabric. The fabric members are preferably in a physical form having a length:average diameter ratio of at least 10:1, more preferably at least 30:1, most preferably at least 100:1. The term "diameter" does not imply limitation to any particular cross-sectional shape, the average diameter of square, triangular, or other cross-sectional shapes being readily determinable for this purpose. The filamentary support and/or any non-curable fabric members used for reinforcement in composites may comprise a tow or roving, and these may be advantageously arranged to provide optimum coverage and thus optimise electrical screening or insulation performance.

The respective layers will preferably be melt-formed coatings applied to the support by melt processing techniques such as extrusion or coextrusion, or dip-coating or other techniques whereby the materials may be caused to flow into the required elongate form without dissolving them in solvents. The components may be sequentially melt-processed (e.g. extruded) to form a single filament fabric member, or may be simultaneously processed (e.g. coextruded) to form such a fabric member, although it may be preferable to apply the first binder layer to the support before applying the subsequent layers. However, other coating techniques are not excluded, and the physical form of the layers is not critical provided the fabric members can be adequately handled. Non-woven fibrous layers of the respective materials, for example, could conceivably be applied. The layers will preferably be substantially concentric, by which is meant that they successively surround each other, regardless of exact geometrical precision.

Preferably, the reactive components in the fabric member are in direct physical contact with each other, although binders and inert additives may be used if desired provided that they do not in practice interfere unacceptably with the curing reaction.

The layers containing the curing components (that is the curing agent and the curable material) will preferably be concentrically coated on the support, or may lie side-by-side along the fibre or filament, so that both components are exposed on its surface. Other arrangements may be used if convenient.

The curable fabric members, preferably when incorporated into a curable fabric, may be used as a reinforcing and/or sealing or adhesive layer between an electrical conductor and a dimensionally recoverable insulating sleeve to be recovered thereon. In this aspect, the invention accordingly provides a dimensionally recoverable article carrying on a surface thereof at least one curable fabric member according to this invention, or a fabric comprising such curable fabric members. Also provided is a method of enclosing at least part of a substrate, which comprises:
 (a) positioning thereon a dimensionally recoverable article such that at least one curable fabric member according to this invention or a fabric comprising such curable fabric members, is disposed between the article and the substrate; and
 (b) recovering the article about the substrate and heating the fabric member(s) to cure them.

A dimensionally-recoverable article is an article the dimensional configuration of which may be made substantially to change when subjected to suitable treatment, preferred such articles being heat-recoverable.

Usually these articles recover, on heating, towards an original shape from which they have previously been deformed, but the term "heat-recoverable", as used herein, also includes an article which, on heating, adopts a new configuration, even if it has not been previously deformed. References hereinafter to "unresolved recovery" means the proportion of dimensional recovery actually achieved to the maximum possible, i.e. complete recovery towards original dimensions.

In their most common form, such articles comprise a heat-shrinkable sleeve made from a polymeric material exhibiting the property of elastic or plastic memory. The original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above a transition temperature thereof, for example, the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat to raise the temperature above the transition temperature will cause the article to assume its original heat-stable shape.

Where the term "recovery temperature" in connection with heat-recoverable articles is used herein, it is intended to refer to the transition temperature above which the article recovers even if some small degree of recovery is exhibited at temperatures slightly below the transition temperature.

In other known articles, an elastomeric member such as an outer tubular member is held in a stretched state by a second member, such as in inner tubular member, which, upon heating weakens and thus allows the elastomeric member to recover.

Articles of this type have, in recent years, become widely used in a number of applications, for example for protecting objects such as electrical cables and cable splices or metal pipes from corrosion or other damage, for example damage caused by penetration of moisture. For this reason many heat-recoverable articles are provided with a coat of adhesive or sealant.

One problem that is associated with the provision of adhesives on heat-recoverable articles is that, when the heat required to melt or otherwise activate the adhesive is supplied solely by heating the external surface of the heat-recoverable article during the recovery process, the temperature to which the adhesive is heated will be considerably lower than that of the external surface of the article due to the relatively poor thermal conductivity of the materials from which the heat-shrinkable article is formed. Thus, for example, where the heat-shrinkable article is formed from a cross-linked polyethylene, the external surface of the article may be heated up to about 250° C. in order to raise the adhesive temperature to only 100° C., and, in this case, no further heating of the article would be possible without damaging the article. Also, in many cases, the maximum temperature to which the adhesive can be raised is restricted by the type of substrate that is being covered. For example, where the substrate is a metal pipe, the thermal conductivity and size of the pipe cause it to act as a heat-sink and effectively limit the adhesive temperature and, where the substrate comprises an uncross-linked polymer as is often the case with electrical cable jackets, the adhesive temperature often cannot be raised above about 100° to 120° C. without damaging the cable jacket.

Whilst hot-melt adhesives or mastics can be used in a number of applications, the maximum temperature to which the article may be subjected after installation is usually limited to the melting or softening point of the adhesive.

It has been found that improved levels of cure are obtained when a heat-recoverable article is recovered over fabric members according to this invention, especially when, as is preferred, the fabric members are incorporated in a fabric and/or the melting point of at least one (preferably both) of the curing components is selected to be not more than 50° C., preferably not more than 10° C. above the recovery temperature of the article. For Class F electrical insulation and other purposes as appropriate, the curing may be partly or entirely effected by heating after recovery of the heat-recoverable article, in which case undischarged recovery forces may continue beneficially to compress the fabric during the cure.

It will be understood that "curing" as used herein is not restricted to systems which form rigid chemical cross-links, provided that the components react together when suitably stimulated, e.g. by heating to produce a significant viscosity increase, an example being polyamide/EVA mixtures which produce such an increase by hydrogen bonding, as described in U.S. Pat. No. 4,018,733.

The curable fabric may be made of two or more kinds of fabric member not all of which kinds need incorporate both curing components as described above.

For example spun yarns containing one of the components and continuous filament yarns containing the other of the components could be combined with yarns containing equal weight of both of the components; or continuous filaments of one of the components could be combined with the last-mentioned yarns where an excess of one of the component over the other is desired.

The curable components of the adhesive composition may be selected according to requirements from known curable systems, provided that they can be formed into layers suitable for use in the fabric members of this invention. Curable materials which are difficult in themselves to handle in the form of fibres or filaments may thus be prepared in suitable physical form with the assistance of the support strand or filament, e.g. a 0.1 mm glass or polyester filament on which the curing agent and curable material may be coated, e.g. by extrusion. Even brittle materials, e.g. epoxies, may be advantageously formulated with a further flexible polymer as mentioned above to form the outermost layer of the fabric members, so that the resulting fabric member can be machine braided, woven or knitted, despite the difficulty or impossibility of machine processing fabric members formed of the brittle material alone. The weight proportion of the further flexible polymer to epoxy will depend to some extent on their respective reactivities and cured properties, but will preferably be within the range from 35:65 to 65:35 most preferably 45:55 to 55:45, especially 50:50.

Preferably the components are such that, if they are brought together into intimate contact for example by dissolving them in a common solvent, they will react together even at room temperature to form a cured product so that curing of the adhesive composition on the article during storage is prevented substantially solely by the physical separation of the components.

In a number of cases it has been found that when a heat-recoverable article is recovered onto a substrate with fabric members according to the invention between the article and the substrate, the components will cure sooner or at a significantly lower temperature than if simply heated to the same temperature without the heat-recoverable article. The fabric members may be carried by the recoverable article or may be applied separately to the substrate then overlaid with the recoverable article. Thus it is possible, to provide an adhesive coated heat-recoverable article in which the adhesive can be cured by heating the article to its recovery temperature for periods in the range of the recovery time of the article, but which will also have good storage life.

The rate of curing of curable adhesives at elevated temperatures is linked to their rate of curing at ambient temperatures, and hence their storage life, by the Arrhenius equation which effectively imposes a limit on the rate of cure of an adhesive at the usual recovery temperature of a heat-shrinkable article (about 100° to 120° C.) for any given storage life at ambient temperatures or vice versa. It can be shown from the Arrhenius equation that any curable adhesive that cures sufficiently rapidly at the recovery temperature of the article. However, it is possible to overcome this problem by virtue of the synergistic increase in the rate of curing of certain adhesives when used in conjunction with a recoverable article.

This synergistic effect is most pronounced when the fusion temperature of the components is in the region of the recovery temperature of the article or the temperature to which the adhesive is heated when the article is recovered. Preferably the fusion temperature is not more that 50° C., especially not more than 30° C. and most especially not more than 10° C. above the recovery temperature of the article. Also, preferably, not more than one, and especially none, of the components has a fusion temperature of less than 50° C. Each of the components preferably has a fusion temperature above 70° C., e.g. in the range 80° to 220° C. and most preferably from 140° to 180° C. for Class F electrical insulation, and, instead or in addition, each has a fusion temperature that differs from the fusion temperature of the or each other reactive component by not more than 30° C.

In most instances the components will melt or soften at their fusion temperature although the term is intended to include sublimation of one or more components if this occurs.

In many cases the reactive components will soften and flow or otherwise fuse over a temperature range and the softening characteristics of the components may be observed by thermomechanical analysis (TMA) as described in "Thermal Analysis" by T. Daniels published by Kogan Page 1973. Accordingly, the fusion temperature or the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile probe loaded with a 50 gramme weight and by increasing the temperature of the material at a rate of 10° C. per minute. Preferably the temperature at which reactive components of the adhesive initially become soft referred to as $T_i$ on the TMA plot) is not more than 30° C. below and especially not more than 25° C. below the melting point ($T_{60}$) of the components so that the difference between the maximum storage temperature and the minimum curing temperature can be reduced as far as possible.

Another synergistic effect that may be shown, either instead of or in addition to the increase in rate of cure, is an increase in the level of curing. The increase in level of curing leads to improved properties such as solvent resistance and improved high temperature properties such as high temperature shear strength.

The level of cure may be measured in a manner of ways. For example, it may be measured as an increase in the $T_{60}$ (as defined above) or, more preferably the T80 of the composition, where $T_{80}$ is defined as the temperature at which the TMA probe has penetrated to 80% of the total thickness of the adhesive. In some cases the composition will cure sufficiently to prevent the probe penetrating it by 80% in which case the total depth of penetration is a better measure of cure. Another measure of the level of cure of the composition is its gel content which is measured by weighing a quantity of the adhesive into an extraction thimble, refluxing the adhesive for 5 to 8 hours with a solvent (e.g. 1,2-dichloroethane or tetrahydrofuran), drying the thimble in an oven for 24 hours to evaporate the solvent and, after leaving the dried thimble in the atmosphere for a further 24 hours reweighing the thimble. The gel content is then defined as the final weight of the adhesive (which is insoluble) expressed as a percentage of the initial weight of the compositon.

For the present purposes, to avoid premature curing which would confuse the results, gel content is preferably measured cold, as follows.

COLD GEL CONTENT

Weigh out accurately between 1.2 g of sample (finely divided) into a 150 ml glass screw top jar. Pour (fume cupboard) 100 mls dichloromethane $CH_2CL_2$ into the jar from a measuring cylinder and seal. Place the jar in an ultrasonic bath at room temperature for 15 minutes. The cooling water on the bath should be on.

Filter the contents of the jar through a predried and preweighed filter paper (Whatman No. 1 7.5 cm) using a Bucher funnel and filter pump. Wash through with a further 50 mls of solvent. Dry the filter paper and retained gel (residue) in the oven at 150° C. for 10 minutes. Allow to cool then re-weigh. Calculate % gel.

The fabric members of this invention cure by reaction of a plurality of mutually reactive components. The phrase "mutually reactive components" is defined herein as meaning components which, when mixed together in dry particulate form, will react together at the fusion temperature thereof or at least at the highest fusion temperature thereof to form a composition having a $T_{80}$ value that is at least 20° C., preferably at least 30° C. and especially at least 40° C. above the initial fusion temperature of the blend. Preferably the components after curing will exhibit a gel content of at least 50%, more preferably at least 60%, especially at least 70%, whereas before curing gel contents of less than 20%, preferably less than 10% especially less than 5% are desirable, and preferably persist at least until the components have flowed and consolidated. It will be appreciated that such flow is assisted by the recovery of a heat-shrinkable driver around the curable fabric.

There is essentially no limit on the size of the curable fabric members, although the absolute value of the cure rate may tend to decrease with large fabric members. The thickness of the fabric members does, however, affect their processability and the maximum fabric web density which can be achieved with a single woven layer of the fabric and it may therefore be necessary to use more than one such layer of the fabric to achieve a desired coverage if very thin fabric members are used. Preferably the fabric members will have a diameter of at least 0.2 mm, for example 0.25 to 0.3 mm, and more preferably at least 0.5 mm, for example 0.75 to 0.8 mm. It is to be understood as aforesaid that references to diameter do not limit the fabric members to substantially circular cross-section, other cross-sections such as square, triangular, oval, hexagonal or indeterminate being perfectly acceptable provided they can be adequately used alone or when incorporated into a fabric.

The curable fabric members preferably consist solely of the support and the three layers described above, although it may be desirable for them to include one or more other inert components.

If the curing agent is not polymeric, for example an organic peroxide or other free radical initiator, it may be necessary for it to be blended with a suitable carrier material, e.g. a polyester or a reactive or unreactive polyamide, before being formed into the fabric member. The curable resin may, instead, comprise a polyamide having free amine groups, in which case the curing agent preferably comprises a material having free or blocked isocyanate functional groups, e.g. a cresyl blocked isocyanate. The preferred curing components, especially for Class F electrical insulation, are multi-functional epoxy resin, especially of the novolak type, and an anhydride curing agent, especially polymeric anhydride curing agents, for example copolymers such as styrene-maleic anhydride.

Chemical curing accelerators may also be present in the curable fabric members, or may be present as separate fabric members or particles, in a fabric incorporating the curable fabric members, provided that they do not unacceptably increase the rate of cure at storage temperatures, thus unacceptably decreasing the storage life of the curable fabric members.

Examples of accelerators include dimethylaminopyridine, tris(dimethylaminomethyl)phenol, tin octoate, imidazole or imidazole derivatives such as salts, substituted imidazoles or metal complexes thereof, and triethylamine.

A number of non-curing components may be mixed with the curable fabric members to modify the overall composition, as long as they do not unacceptably affect the curing, and preferably do not affect the increase in rate or level of cure of the composition. Also it is preferred that they do not adversely affect the storage life.

Inert components that may be mixed with the curable fabric members for some end uses include plasticisers such as phthalates or rosin esters, thermoplastic or thermosetting polymers, cured or uncured rubbers, inorganic materials to modify the properties of the uncured or cured adhesive such as reinforcing fillers, reinforcing fibres or microspheres, or tackifiers and the like. The other components, whether organic or inorganic, may be in any appropriate physical form, for example they may be in the form of powder, flake or fibres, and are preferably present in an amount of from 5 to 50 percent by weight based on the total weight of the composition. In a preferred aspect of the invention the composition contains one or more other components having a softening temperature range (from the initial softening temperature to $T_{60}$) that is greater than that of the reactive components so that the softening temperature range of the composition as a whole is greater than that of the reactive components, preferably by at least 5° C. This has the advantage that, whilst the composition will cure when heated to only a relatively low temperature above the maximum storage temperature, it will possess cohesive and adhesive strength over a significantly greater temperature range. Alternatively, in some cases where the reactive components have a large softening temperature range it may be desirable to reduce the softening temperature range of the composition by incorporation of the appropriate components for example tackifier resins such as hydrogenated rosin esters and terpene phenols or polar waxes such as polyamide and polyester waxes.

As examples of other components that may be incorporated in the compositions, there may be mentioned tacky materials such as pressure sensitive adhesives or mastics, or thermoplastic materials. The components are preferably, although not necessarily, fluid at temperatures below the melting point of the reactive components, but if they are not they should be such as to allow the reactive components to mix together at the recovery temperature of the article.

The fabric members according to the invention and fabrics comprising them may be carried on recoverable articles in a number of configurations depending on the particular use. The articles may be in the form of a tube that has been extruded and expanded radially to render it heat-recoverable, the tube being either in continuous lengths or discrete pieces and carrying on its internal surface the fabric adhesive compositions. Alternatively, the articles may be in the form of a sheet or tape that can be wrapped or wound around an object. More complex shapes, commonly referred to as boots, transitions, udders or caps, may be formed by moulding the articles in the desired configuration and then expanding them or by the methods described in our U.K. Published Patent Applications Nos. 2083403A and 2083859A. The fabric members of the present invention are also suitable for use on wrap-around devices. So called wrap-around devices are employed for sealing, insulating or otherwise protecting a substrate where the use of a preformed tubular article such as a sleeve is not possible or convenient e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are known and one form of wrap-around device in which the curable fabric members may be especially useful is that described in our U.K. Published Patent Application No. 2076694A, which comprises a layer of sealant that may be peeled away at any desired point to expose an underlying layer of a closure adhesive. The fabric members of the present invention can be well adapted to such a peeling operation.

In hollow articles, either moulded as such or formed by wrapping, the fabric members may be advantageously arranged as a ring on the inner surface at or near an aperture in the article to seal the aperture to a substrate about which the article is to be recovered in use.

Another preferred article which may carry the fabric members according to the invention is in the form of a continuous tape or sheet, one surface of which carries the fabric members. Such an article may be wound helically around a substrate for example a metal pipe which is preferably pre-heated, and the wound portions of the tape or sheet may be heated to recover the tape or sheet and cure the fabric members. Often it is desired to operate further on the pipe shortly after the protective article has been recovered thereon, for example to bury it in a pre-dug trench and, because of the rapid cure of the adhesive composition, it is possible to perform such operations only a few minutes after the tape or sheet according to the invention has been recovered thereon.

The curable fabric members may be attached to the heat-recoverable article in a number of ways depending on the type of article and the arrangement of the fabric members. For example, where the article has an open, generally uniform configuration, it may be provided with a layer of tacky material for example pressure sensitive adhesive layer e.g. by spraying or in the form of a tape, and the curable fabric members preferably arranged in the form of a fabric may be applied thereto by application of pressure, pressures in the order of 0.8

MPa (120 p.s.i.) and temperatures of about 15° to 30° C. having been found suitable in practice. Other methods such as welding or sewing may also be used to attach the fabric members.

In another method of applying the fabric members, the fabric members are mixed or coated with other components which preferably comprise or include a pressure-sensitive adhesive or a mastic and the whole composition is pressed onto the heat-recoverable article, the temperatures and pressures used preferably being the same as those mentioned above.

Curable fabrics can be made solely of the curable fabric members as described above or can contain other fabric members in addition to the curable members. The fabric can be knitted, woven, non-woven, braided, or the like. In non-woven fabrics, additional fibres of the reactive components may be spun separately then blended or layered with the curable fabric members of this invention to form the fabric. In a preferred embodiment the fabric is a braided fabric since this facilitates change of diameter when a heat-recoverable article is recovered thereover. The fabric can contain only the curable fabric members or it can contain the curable members together with non-curable fibres or filaments. For example, the fabric can contain curable fibres in one direction and non-curable strength fibres in the other. This produces a curable fabric which is especially strong in one direction. The fabric can be woven in a pattern, for example, twill, satin, sateen, Leno, plain, hop sack, sack, matt and various weave combinations in single or multiple ply weaves e.g. 2- or 3-ply weaves. The ratio of the reactive components is preferably stoichiometric 1:1, but may vary within the range from 1:9 to 9:1 to suit particular requirements of materials and level of cure. The fabric may alternatively be knitted if desired, either by warp knitting or weft knitting.

The components used in the fabric members according to the invention preferably have a softening point that increases on application from the melting or softening points of the components, e.g. in the order of 90° to 95° C. to a value of about 130° to 140° C. or even higher and so combine low initial application temperatures with relatively high use temperatures. Furthermore, whilst the cured fabric members exhibit relatively high bond strengths when subject to shear stresses they also exhibit surprisingly high bond strengths at high temperatures in the peel mode, e.g. in the order of 80 to 100N(25 mm)$^{-1}$ between polyethylene substrates in contrast with conventional epoxy adhesives which have extremely low peel strengths.

For making consolidatable curable composites, the invention may provide either (1) an assembly comprising a layer of the curable fabric members of this invention associated with reinforcing non-curable fabric members, preferably in a separate layer, so that application of appropriate heat and pressure will cause the curing components to flow and cure throughout the mass of fabric members to produce a cured consolidated composite; or (2) an assembly comprising a preferably tubular heat recoverable driver and associated (preferably telescoped) therewith a preferably tubular layer comprising one or more fabric members according to this invention, preferably associated with further reinforcing fabric members preferably in a further tubular member preferably telescoped with the other tubular member(s), the arrangement being such that the assembly can be heated to recover the driver causing the curing components to flow and cure throughout the mass of fabric members to produce a cured consolidated composite. For Class F electrical insulation purposes, the assembly preferably has the layer of curable fabric members between the driver and the layer of reinforcing (preferably non-curable) fabric members, a telescoped arrangement of three tubes being preferred. A further layer of the curable fabric members may be provided to sandwich the reinforcing layer if higher proportions of curable material are desired.

The tubular member preferably has two open ends. Preferably the member is generally circular in cross section and especially preferably is cylindrical. Both straight and bent tubular members are included.

The driver and the other layer(s) are preferably telescoped such that the driver is on the outside of the other layer(s) and the driver is arranged to recover radially inwards, that is to be heat shrinkable. In another embodiment, the driver may be positioned within the other layer(s) and be arranged to recover outwardly, that is to be heat expandable. In use, when the assembly has been consolidated and bonded to the substrates, the driver may, if desired, be removed and discarded, although better electrical performance will usually result if it is retained, especially if a continuous tube or sheet of electrically insulating polymer such as polyvinylidene fluoride e.g. (Kynar Trade Mark) is used.

The fabric members of the reinforcement are preferably provided by a fabric layer, especially preferably by a braid. Other fabric constructions, for example, weaves or knits may also be used. The fibres of the fabric may be provided as single fibres, or in bundles of fibres commonly known as "tows" As other examples the fibre reinforcement may be provided by short lengths of fibres, for example as short chopped fibres or staple fibres, or by filament wound fibres.

The material of the fibre reinforcement is preferably compatible with the curable material, and the fibre reinforcement is preferably incorporated in the composite assembly at a sufficiently high density to provide structural strength to the coupling. As examples of fibres that may be used there may be mentioned carbon, glass, boron, and silica fibre, natural fibres such as cotton, organic fibres such as nylon polyesters and polyamides, and metallic fibres such as stainless steel and aluminium. Appropriate materials for electrical insulation can be selected from these. A single type of fibre may be used or a combination of different types of fibre. Also where a fibre comprises a bundle of filaments in a so-called 'tow' or 'roving' the filaments in each tow or roving may be the same or different. Thus for example a mixed tow may comprise a bundle of both organic and inorganic filaments. As examples, in some embodiments, it is preferred for at least some of the fibres to be metal, for example where the composite is required to provide electromagnetic shielding. In other embodiments it is preferred to incorporate some conductive fibres, for example metal or conductive polymeric fibres to enable an electrical current to be passed through the composite.

The softening or melting temperature of the fibres of the fibre reinforcement is preferably greater than the curing temperature and the recovery temperature of the recoverable member if present. The difference between the softening temperature and the curing temperature is preferably in the range 5° to 50° C., more preferably 15° to 35° C., especially preferably about 20° C.

The fibre reinforcing fabric members and the curable fabric members of the composite assembly may be provided in a variety of arrangements. In one embodiment a fibre reinforcement and the curable fibres are provided as discrete layers. Thus, for example an assembly according to the invention may comprise an outer driver, an inner layer of curable fibres, and a fibre reinforcement layer, for example a braid sandwiched therebetween. Alternatively the fibre reinforcement and the curable layer may be interchanged such that the fibre reinforcement layer is the inner layer as is preferred, this arrangement consolidating more uniformly. In another embodiment the curable fabric members in the unconsolidated composite provide a matrix in which the fibrous reinforcement is incorporated.

It is preferred to use of a curable braid in which the curable fabric members making up the braid have a sufficiently high flow temperature to maintain the surface of the fibres in a "non-tacky" state so that the fibres are free to slide over each other. In particular at the cross-over points of the braid the fibres are free to slide relative to each other. This enables the braid to change its braid angle at the recovery temperature of the driver which change in braid angle enables the braid to conform to the shape of the recovering driver. The method of change of shape of the braid by a change in braid angle is particularly preferred since it means that the fibres which make up the braid tend to remain straight and little or no wrinkling of the fibres, which tends to weaken the resulting composite, is required in order to accommodate the shape change. Preferably, the flow temperature of the curable material is not significantly higher than the recovery temperature of the driver, such that further heating of the assembly softens the polymer allowing the composite to consolidate under the action of the recovering driver. Preferably however the flow temperature is sufficiently high to allow some tolerance in the application of heat while still preventing premature softening which would prevent slippage at the braid angle cross-over points. Preferably the difference in temperature between the flow temperature of the polymer and the recovery temperature of the driver is in the range 5° to 50° C., more preferably in the range 15° to 35° C., especially preferably about 20° C.

When the preferred two or more layer coating is applied to the fibres, the above stated criteria for the flow temperature need apply to the outer coating only, and similar criteria will preferably be applied to any coating(s) carried by the separate reinforcing fabric members mentioned above.

The curable polymeric material and curing agent of the curable fabric members, if not the preferred materials described for Class F electrical insulation, may be, for example, the curable components and the fibres and fabrics described in U.K. Patent Applications Publication Nos. 2135673, 2139227, and 2139228, and European Published Application No. 0117738.

Turning now to the driver, this may take many forms. In a preferred embodiment the driver is tubar, having two open ends, and is, preferably generally cylindrical. As other examples, the driver may be in the form of a so called "wraparound" sleeve, that is in the form of a flat sheet that is wrapped around or within the coupling member, opposed edges of the sheet being held together by a closure member, or the driver may be in the form of a tape, or a longitudinally recoverable fibre or a wire that is helically wrapped around or within the coupling member or in the form of a fabric for example a woven or braided member. For Class F electrical insulation and other end uses requiring post-recovery heating to complete curing, the driver must be capable of maintaining physical integrity during the cure cycle. Suitable materials can be chosen by simple trial and error.

The form and the material of the recoverable driver, can be selected such that the recovery force is sufficient to consolidate the polymer of the fibre reinforced member. Preferably the material of the driver is polymeric. Thus, for example a heat recoverable polymeric tubular driver may be used (preferably of polyvinylidene fluoride for electrical purposes, or a heat-recoverable polymeric, spirally wrapped fibre.

It was expected that as the viscosity of the polymeric material to be consolidated increased, the force required to effect consolidation would increase correspondingly. However, it has surprisingly been found that unexpectedly low recovery forces are required to consolidate polymeric materials of high viscosity.

Consolidation of the composite and bonding to a substrate is achieved by first heating the curable polymer sufficiently to allow it to flow under the influence of the recovering driver into the interstices between the fibres, and then allowing the consolidated composite to cool before or after completion of curing.

The temperature to which the article must be heated to effect the consolidation depends on the materials of both the composite and the driver. In general as the temperature rises the viscosity of the (as yet uncured) polymer decreases so that it can flow more readily. On the other hand as the temperature rises the recovery force of the recoverable driver decreases for most recoverable drivers. Thus an appropriate combination of driver and coupling member must be selected which balances the decrease in viscosity (which enhances consolidation) and the decrease in recovery force (which detracts from consolidation).

Selection of an appropriate driver and curable polymeric material may be assisted by reference to the graph in FIG. 1 of the accompanying drawings. This shows the recovery force needed to consolidate non-curing composites as a function of the viscosity of the non-curing polymeric material. Thus, given the viscosity of a curable (but as yet uncured) polymer at or just above its melting point, the recovery force of the driver needed to effect consolidation at that temperature may be approximated from the graph. If it is desired to use a driver with a lower recovery force than that required at the melting point of the polymer, it is necessary simply to increase the temperature further above the melting point of the polymer until the viscosity of the polymer is reduced to the value indicated by the graph which can be consolidated by the desired lower recovery force. The graph of FIG. 1 was calculated using the following procedure:

1. The recovery stress of five heat shrinkable drivers were measured at 200°, 220°, 235°, 250°, 300° and 350° C. Two spirally wrapped polyester fibre drivers were used, viz spirally wrapped polyester fibre, and drawn polyaryletherketone fibre, and three tubular drivers viz polyvinylidene fluoride tubing, nylon tubing and a silicone elastomer tubing.

(a) For the spirally wound fibres, the recovery stress of a straight fibre was measured by clamping a single fibre between the jaws of an Instron Tensile Testing Instrument at the required temperature and monitoring the recovery force exerted, and the recovery force of a spirally wound fibre was then calculated, given the value for the straight fibre.

(b) For the tubular drivers, the recovery stress was measured by recovering the tube over a split mandrel held in an Instron Tensile Testing Instrument at the required temperature and monitoring the force exerted.

2. The viscosity of several thermoplastic materials (including nylon 6) were measures in the temperature range ambient to 350° C. using a Rheometric Dynamic Spectrometer.

3. Consolidation of a braid of glass fibre tows impregnated with nylon 6 was carried out in a laboratory oven on a stainless steel mandrel between the temperature range of 200° C. to 350° C. The temperature at which consolidation took place was noted, consolidation being measured visually, microscopically and by noting the differences in the densities of the braided material.

4. The results are set out in Table I.

5. The results set out in the table determine the temperature at which consolidation takes place for each driver. (1) above gives the recovery force of that driver at the observed consolidation temperature, and (2) above gives the viscosity of the thermoplastic being consolidated at the observed consolidation temperature. Thus graph of FIG. 1 can be constructed. The five points plotted on the graph are generated, reading left to right, by the polyvinylidene fluoride tubing, nylon fibre, silicone tubing, spirally wrapped polyester fiber, and drawn polyaryletherketone fiber.

TABLE I

| Driver | Temperature °C. | | | | | |
|---|---|---|---|---|---|---|
| | 200 | 220 | 235 | 250 | 300 | 350 |
| Polyester spirally wrapped fibre | X | X | SL | GOOD | — | — |
| Polyvinylidene fluoride tubing | X | X | X | SL | GOOD | — |
| Nylon tubing | X | X | X | SL | GOOD | — |
| Silicone elastomer tubing | X | X | X | SL | SL | GOOD |
| Polyaryletherketone spirally wrapped fibre | X | SL | GOOD | GOOD | GOOD | GOOD |

SL = Slight consolidation of nylon impregnated glass fibre braid
GOOD = GOOD consolidation of nylon impregnated glass fibre braid
X = NO consolidation of nylon impregnated glass fibre braid
— = No measurements made A group of materials which have a high recovery temperature and appreciable recovery force even at high temperatures, and which can accordingly be used in combination with a polymer having high viscosity at curing temperatures and therefore need to be heated to high temperatures to cause them to flow, are polyaryether ketones.

The recovering driver not only effects consolidation of the composite tube but also enhances bonding of the composite to the substrates about which it is recovered by applying a force to the bond interface. The bonding achieved depends on the substrates about which the composite is recovered. As examples bonding may be for example by adhesion, or by fusion. For an adhesive bond the polymeric material of the coupling member itself may act as an adhesive on the substantially solid substrate or a separate adhesive may be used (as described below). Adhesive bonding may be used for example, for bonding to a metal substrate. By a fusion bond is meant a bond wherein the polymeric material of the composite, (or of any additional lining layer between the composite and the substrate) and the material of the substrate flow together to form a homogenous bridge between the parts with no discernable interface therebetween. Fusion bonding might be used for example for bonding to a polymeric substrate.

After consolidation of the coupling member the driver may or may not be retained. Where lack of space is a problem, and, or where low weight is important it is preferred to discard the driver. For other applications, the extra step of discarding the driver may be unnecessary. Indeed for some applications retention of the driver is a positive advantage since, for example, it provides additional burst strength to the composite, or, as aforesaid, enhances electrical insulation properties.

For some applications it is preferred to include a liner between the composite and the substrate. For example, although the polymeric material of the composite may itself act as an adhesive to bond the composite to the substrate, for some applications it is preferred to include an additional adhesive or sealant as a liner, either to improve the bond to the substrates or to improve the environmental sealing of the substrates, or both. The adhesive or sealant liner may comprise the same material as the polymeric material of the composite to enhance bonding between the liner and the composite. As examples of adhesives and sealants that may be used there may be mentioned hot melt adhesives such as low molecular weight polyamides and that class of thermoplastic materials known as nylons, and thermosetting adhesives of known kinds. Applications where it is preferred to include a separate adhesive or sealant liner include applications where a high degree of either burst or pull out strength, is required. In such cases it is preferred to use a composite that has a high fibre density, and consequenty has a low curable polymer density and the quantity of polymer in the composite may therefore be insufficient both to consolidate the tube and to flow to bond and to seal to the substrates, making it preferable to include an additional adhesive or sealant liner. The adhesive or sealant liner is preferably tubular.

In another embodiment it is preferred to include an impermeable layer, for example a polyvinylidene fluoride layer or a metal layer for example of aluminium foil, between the composite and the substrates. It is believed that the impermeable layer acts to spread out any pressure acting on the composite over its entire surface, thus minimising the possibility of localised failure, and hence improving the strength, particularly the burst strength of the composite, which is especially useful in coupling together substrates such as pipes, as described and claimed in commonly assigned U.S. patent application Ser. No. 767,300, filed Aug. 19, 1985, now abandoned.

The liners described above may be used alone, or in combination. Indeed where an impermeable layer is used which is not itself bondable directly to the substrates, an additional adhesive layer must also be included.

A single layer may be used, or a plurality of shorter liners. For example, two tubular liners may be included, one at each end of the tubular composite.

Where a single liner is used it is preferably shorter in length that the composite, and positioned such that a length of the composite projects at either end thereof. With this arrangement the direct bonding of the composite to the substrate at each end of the assembly resists longitudinal pulling apart of the substrates, which might cause difficulties if the liner were coterminous with the coupling member.

After recovery and curing of the assembly about a suitably shaped mandrel, the driver, or the mandrel, or both, may be discarded. The resulting fibre reinforced consolidated cured, tube may be used, for example, as a structural member, or as a coupler, or as a pipe.

Embodiments of the present invention will now be described, by way of example.

EXAMPLE 1

Reactive Fibre

Double twist E-glass fibre of 2×68 tex, having a known T6 size coat was melt coated with Macromelt 6301 (Trade Mark) polyamide to a coating weight approximately ⅔ the weight of the uncoated glass fibre. This coated fibre was passed through two further melt coating baths, the first of which applied the aforementioned 80:20 mixture of SMA2000:DBP at a coating weight approximately twice the weight of the uncoated glass fibre, and the second of which applied a 50:50 mixture of DEN485 (Trade Mark) epoxy novolac (Epoxide equivalent weight 165-195 from Dow Chemicals Co.) and Vitel 5571 (Trade Mark) cross-linkable polyester (low OH content, Ring and Ball softening point 150° C., from Goodyear), at a coating weight approximately 2¼ times the weight of the uncoated glass fibre.

The fibre was cooled as far as possible between the first and second coating baths to avoid premature curing, and the finished curable fibre had a diameter of 1+− 0.15 millimeters, a linear density of 0.79+−0.07 g/m, and a composition of

| E-glass sized fibre | 17.3 ± 1.3% |
|---|---|
| Macromelt 6301 | 11.3 ± 0.9% |
| SMA2000 + DBP | 33.2 ± 1.0% |
| DEN485 + Vitel 5571 | 38.2 ± 3.0% |

The initial gel content of this reactive fibre was zero.

In the following Examples of composites, these fibres were braided to produce the "reactive braid" referred to with an optical coverage of 85 to 100% (i.e. less than 15% holes between fibres). A Kynar (Trade Mark) sleeve was heat shrunk onto the composites on a steel or Teflon (Trade Mark) mandrel using a hot air gun, and the curing reaction was completed by heating in an oven at 150°-175° C. for 1-4 hours, after which further heating at 160° C. did not significantly increase the gel content.

EXAMPLE 2

(Composite I)

STRUCTURE—ONE LAYER OF GLASS FIBRE BRAID SANDWICHED BETWEEN TWO LAYERS OF REACTIVE BRAID.
INSTALLATION
  MANDREL d=12.5 mm
  KYNAR d=25.4 mm
  HOT-AIR GUN
CONSOLIDATION—175° C. FOR 17 HOURS

PROPERTIES

PHYSICAL PROPERTIES

| GLASS FIBRE CONTENT = | 25-30% b.w |
|---|---|
| GEL CONTENT = | 77% |
| DENSITY = | 1.33 g/cm³ |
| WALL THICKNESS (WITH KYNAR) = | 2.2 mm |

ELECTRICAL PERFORMANCE

| | BEFORE AGEING | AFTER AGEING (1 week at 220° C.) |
|---|---|---|
| Breakdown voltage (standard transformer oil, voltage rise = 685 V/sec) | 37 Kv at RT<br>14 Kv at 143° C. | 25.5 Kv at RT<br>19.1 Kv at 143° C. |
| Specific electrical breakdown | 168 Kv/cm at RT<br>64 Kv/cm at 143° C. | 115.9 Kv/cm at RT<br>86.8 Kv/cm at 143° C. |
| Permittivity | 4.2 at RT<br>5.6 at 150° C. | 4.03 at RT<br>7.37 at 150° C. |
| Loss Factor | 0.05 at RT<br>0.23 at 150° C. | 0.0451 at RT<br>0.294 at 150° C. |
| Volume Resistivity | $9.5 \times 10^{12}$ ohm · cm at RT<br>$3.5 \times 10^{11}$ ohm · cm at 150° C. | $1.42 \times 10^{14}$ ohm · cm<br>$5.55 \times 10^{10}$ ohm · cm |

MECHANICAL PERFORMANCE

| | BEFORE AGEING | AFTER AGEING (1 week at 220° C.) |
|---|---|---|
| Flexural strength | 37 MPa at RT | 73 MPa at RT |
| Flexural Modulus | 5200 MPa at RT | 7140 at RT |

EXAMPLE 3

(Composite II)

STRUCTURE—ONE LAYER OF GLASS FIBRE BRAID BENEATH ONE LAYER OR REACTIVE BRAID.
INSTALLATION
  MANDREL d=12.5 mm
  KYNAR d=19.0 mm
  HOT-AIR GUN
CONSOLIDATION—175° C. FOR 17 HOURS

PROPERTIES

PHYSICAL PROPERTIES

| GLASS FIBRE CONTENT = | 42% b.w |
|---|---|
| GEL CONTENT = | 82% |
| DENSITY = | 1.33 g/cm³ |

ELECTRICAL PERFORMANCE

|  | BEFORE AGEING | AFTER AGEING (1 week at 220° C.) |
|---|---|---|
| Breakdown voltage (standard transformer oil, voltage rise = 685 v/sec) | 25.5 Kv at RT<br>19.0 Kv at 143° C. | 22.5 Kv at RT<br>16.6 Kv at 143° C. |
| Specific electrical breakdown | 170 Kv/cm at RT<br>127 Kv/cm at 143° C. | 150 Kv/cm at RT<br>110 Kv/cm at 143° C. |
| Permittivity | 4.42 at RT<br>5.68 at 150° C. | 4.06 at RT<br>5.79 at 150° C. |
| Loss Factor | 0.045 at RT<br>0.145 at 150° C. | 0.024 at RT<br>0.202 at 150° C. |
| Volume Resistivity | $1.36 \times 10^{14}$ ohm · cm at RT<br>$1.70 \times 10^{10}$ ohm · cm at 150° C. | $2.32 \times 10^{14}$ ohm · cm<br>$2.85 \times 10^{11}$ ohm · cm |

MECHANICAL PERFORMANCE

|  | BEFORE AGEING | AFTER AGEING (1 week at 220° C.) |
|---|---|---|
| Flexural strength | 73 MPa at RT<br>9.50 MPa at 150° C. | 134 MPa at RT<br>42.5 MPa at 150° C. |
| Flexural modulus | 3471 MPa at RT<br>209.07 MPa at 150° C. | 11.760 MPa at RT<br>4150 MPa at 150° C. |

EXAMPLE 4

(Composite III)

STUCTURE—ONE LAYER OF GLASS FIBRE BRAID BENEATH A LAYER OF FILAMENT WOUND REACTIVE FIBRE. GLASS FIBRE BRAID: EXPANDO TRADE MARK GLASS BRAID.

INSTALLATION
    MANDREL d=12.5 mm
    KYNAR d=19.0 mm
    HOT-AIR GUN
CONSOLIDATION—175° C. FOR 17 HOURS

PROPERTIES

PHYSICAL PROPERTIES

| GLASS FIBRE CONTENT = | 50% b.w |
|---|---|
| GEL CONTENT = | 80% |
| DENSITY = | 1.43 g/cm³ |
| WALL THICKNESS (WITH KYNAR) = | 1.3 mm |

ELECTRICAL PERFORMANCE

|  | BEFORE AGEING | AFTER AGEING (1 week at 220° C.) |
|---|---|---|
| Breakdown voltage (transformer oil, 685 v/sec) | 23.5 Kv at RT<br>17.1 Kv at 143° C. | 22.3 Kv at RT<br>16.6 Kv at 143° C. |
| Specific breakdown voltage | 180 Kv/cm at RT<br>131.5 Kv/cm at 143° C. | 171.5 Kv/cm at RT<br>127.7 Kv/cm at 143° C. |
| Permittivity | 3.74 at RT<br>4.72 at 150° C. |  |
| Loss Factor | 0.054 at RT<br>0.234 at 150° C. |  |
| Volume Resistivity | $1.65 \times 10^{14}$ ohm · cm at RT<br>$3.19 \times 10^{10}$ ohm · cm at 150° C. |  |

-continued

| WALL THICKNESS (WITH KYNAR) = | 1.5 mm |
|---|---|

EXAMPLE 5

(Composite IV)

STRUCTURE—ONE LAYER OF GLASS FIBRE BRAID BENEATH ONE LAYER OF FILAMENT WOUND REACTIVE FIBRE.

INSTALLATION
    MANDREL d=12.5 mm
    KYNAR d=19.0 mm
    HOT-AIR GUN
CONSOLIDATION—175° C. FOR 17 HOURS

PROPERTIES

PHYSICAL PROPERTIES

| GLASS FIBRE CONTENT = | 38% b.w |
|---|---|
| GEL CONTENT = | 83% |
| DENSITY = | 1.47 g/cm$^{-3}$ |
| WALL THICKNESS (WITH KYNAR) = | 1.08 mm |

We claim:

1. A heat-curable fabric member comprising a filamentary support, a first layer of adhesion-promoting material on the support, a heat-flowable second layer comprising one or more curing agents, and a flexible heat-flowable third layer comprising curable polymeric material, said three layers being separate, the adhesion-promoting material causing at least the second layer to adhere to the support and the curable material undergoing a curing reaction with the curing agent(s) when their respective layers are heated to a flowable state.

2. A heat-curable fabric member comprising a filamentary support, a first heat-flowable layer comprising one or more curing agents and a second heat-flowable curable layer which is brittle and comprises brittle curable polymeric material and a further polymeric material which flexibilizes the brittle curable material, said first and second layers being separate, the curable layer forming an outer surface of the fabric member, and at least the brittle curable material undergoing a curing reaction with the curing agent(s) when their respective layers are heated to a flowable state.

3. A fabric member according to claim 2, wherein the flexibilising further polymeric material is curable and also undergoes a curing reaction with the curing agent(s) when their respective layers are heated to a flowable state.

4. A fabric member according to claim 2, wherein the brittle curable material is an epoxy material.

5. A fabric member according to claim 2, wherein the further polymeric material is a polyester.

6. A fabric member according to claim 2 comprising a flexible first layer of adhesion-promoting material on the support, a second layer comprising the curing agent, and a third layer comprising the brittle material and further polymeric material.

7. A fabric member according to claim 1, wherein the second layer is carried on the first layer and the third layer is carried on the second layer.

8. A fabric member according to claim 1, wherein the adhesion-promoting material of the first layer has a softening or melting point not more than 20 C.°, preferably not more than 10 C.°, different from that of the second layer.

9. A fabric member according to claim 1, wherein the curing agent layer is brittle.

10. A fabric member according to claim 1, wherein the respective layers on the support are substantially concentric.

11. A fabric member according to claim 1, wherein the support has a softening or melting temperature higher than the curing temperature.

12. A fabric member according to claim 1, wherein the curable material comprises epoxy material and the curing agent comprises a solid anhydride curing agent.

13. A fabric member according to claim 1, wherein the curing agent comprises styrene-maleic anhydride adduct.

14. A fabric member according to claim 1 having a thermoplastic polymer, preferably a polyester or polyamide, as the adhesion-promoting material on the support.

15. A fabric member according to claim 1 incorporating a plasticiser for the adhesion-promoting material.

16. A fabric comprising one or more fabric members according to claim 1.

17. A fabric comprising one or more fabric members according to claim 1, which fabric has been cured.

18. Class F electrical insulation comprising at least one fabric member according to claim 1, which has been cured.

19. A composite assembly of curable fabric members according to claim 1, together with other non-curable fabric members, arranged so that the composite can be consolidated and cured by application of heat and pressure.

20. A composite assembly according to claim 19 associated with a dimensionally recoverable driver so that recovery of the driver in use compresses the composite to assist consolidation thereof.

21. A composite assembly according to claim 20 wherein the driver is a tubular member of polyvinylidene fluoride.

22. A composite assembly according to claim 19 comprising a tubular layer of the non-curable fabric members at least partly telescoped inside a tubular layer of the curable fabric members.

23. A composite assembly according to claim 22, comprising a further tubular layer of the curable fabric members at least partly telescoped inside the layer of non-curable fabric members.

24. A composite assembly according to claim 19, wherein the fabric members are in the form of fabric(s).

25. A composite assembly according to claim 19, which has been consolidated and cured.

26. A composite assembly according to claim 19, which has been consolidated and cured and is serving as electrical insulation.

27. A method of making a reinforced cured composite structure comprising arranging on a substrate a layer comprising at least one curable fabric member according to claim 1, and applying heat and pressure to consolidate and cure the structure.

28. A method according to claim 27 comprising arranging a layer of non-curable fabric members between the curable layer and the substrate before consolidating and curing the structure.

29. A method according to claim 28 comprising arranging a further layer comprising at least one curable fabric member according to claim 1, between the non-curable layer and the substrate before consolidating and curing the structure.

30. A method according to claim 27, wherein a heat-recoverable article is used to consolidate the structure.

31. An electric motor comprising electrical insulation produced by consolidation and curing of a composite assembly according to claim 19.

32. An electric motor comprising electrical insulation produced by heat recovery of the driver to consolidate and cure a composite assembly as claimed in claim 20.

33. A composite assembly according to claim 19, wherein the curable fabric members are confined to or concentrated in selected portions of the assembly by patterned layering, weaving, knitting or braiding.

* * * * *